United States Patent
Pare et al.

(10) Patent No.: US 10,960,304 B1
(45) Date of Patent: Mar. 30, 2021

(54) LIVE MIGRATION FOR HOSTED SESSIONS

(71) Applicant: Amazon Technologies, Inc., Reno, NV (US)

(72) Inventors: Geoffrey Scott Pare, Seattle, WA (US); Bruce Erwin Brown, Burien, WA (US); Christopher David Byskal, Redmond, WA (US); Hok Peng Leung, Redmond, WA (US); Alexis Levasseur, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/984,884

(22) Filed: May 21, 2018

(51) Int. Cl.
*A63F 13/30* (2014.01)
*G06F 9/48* (2006.01)
*H04L 29/08* (2006.01)

(52) U.S. Cl.
CPC ............ *A63F 13/30* (2014.09); *G06F 9/4856* (2013.01); *H04L 67/148* (2013.01); *A63F 2300/5533* (2013.01)

(58) Field of Classification Search
CPC ............. A63F 13/30; A63F 2300/5533; G06F 9/4856; H04L 67/148
USPC ....................................................... 709/223
See application file for complete search history.

(56) References Cited

U.S. PATENT DOCUMENTS

| | | | |
|---|---|---|---|
| 10,284,636 B2 * | 5/2019 | Stelmar Netto | H04L 41/5003 |
| 10,456,673 B1 * | 10/2019 | Leung | A63F 13/358 |
| 2011/0212783 A1 * | 9/2011 | Dale | H04L 67/1002 463/42 |
| 2014/0256420 A1 * | 9/2014 | Justice | G06F 12/00 463/29 |
| 2015/0375113 A1 * | 12/2015 | Justice | A63F 13/355 463/42 |
| 2018/0013820 A1 * | 1/2018 | Jacob | H04L 67/10 |
| 2018/0241825 A1 * | 8/2018 | Bolton | H04L 67/42 |
| 2018/0280797 A1 * | 10/2018 | Murakami | A63F 13/34 |

* cited by examiner

*Primary Examiner* — James E Springer
(74) *Attorney, Agent, or Firm* — Hogan Lovells US LLP

(57) ABSTRACT

Live migration can be performed for a process executing on an allocated resource for an application session. During a session it might be determined that it is necessary, or would at least be advantageous, to migrate the process to different resource capacity. New capacity such as a new computing instance can be identified, and synchronized with a current instance to reflect current state information. This can include obtaining state data from a serialized file or transaction log, among other such options. The client devices on the session can be caused to connect or direct state data to the new instance, and when ready the new instance can be responsible for the process, such as by taking over as the application server for the session. Once the client devices are utilizing the new instance, the process can be terminated on the old instance and the instance destroyed or reallocated.

20 Claims, 9 Drawing Sheets

LIVE MIGRATION FOR HOSTED SESSIONS

BACKGROUND

The widespread adoption of a variety of computing devices has resulted in a corresponding increase in the variety of applications available to users. For gaming applications, many of these games enable users to engage in online multiplayer games, which may be hosted by a central gaming server. The amount of resource capacity needed to host the variety of games has become significant, such that many providers use third party resource providers to host the games. While such an approach prevents the game developers from having to purchase and manage a large fleet of resources, the need to purchase capacity from these providers can still be significant. For large games that require significant capacity, this can still be too expensive for the developers to utilize for an extended period of time, or without charging excess fees to the players of those games. Even if capacity is obtained that is reasonable at one point in time, conditions may change that cause the obtained capacity to be less than optimal for the current allocation.

BRIEF DESCRIPTION OF THE DRAWINGS

Various embodiments in accordance with the present disclosure will be described with reference to the drawings, in which.

DETAILED DESCRIPTION

Figure 1:
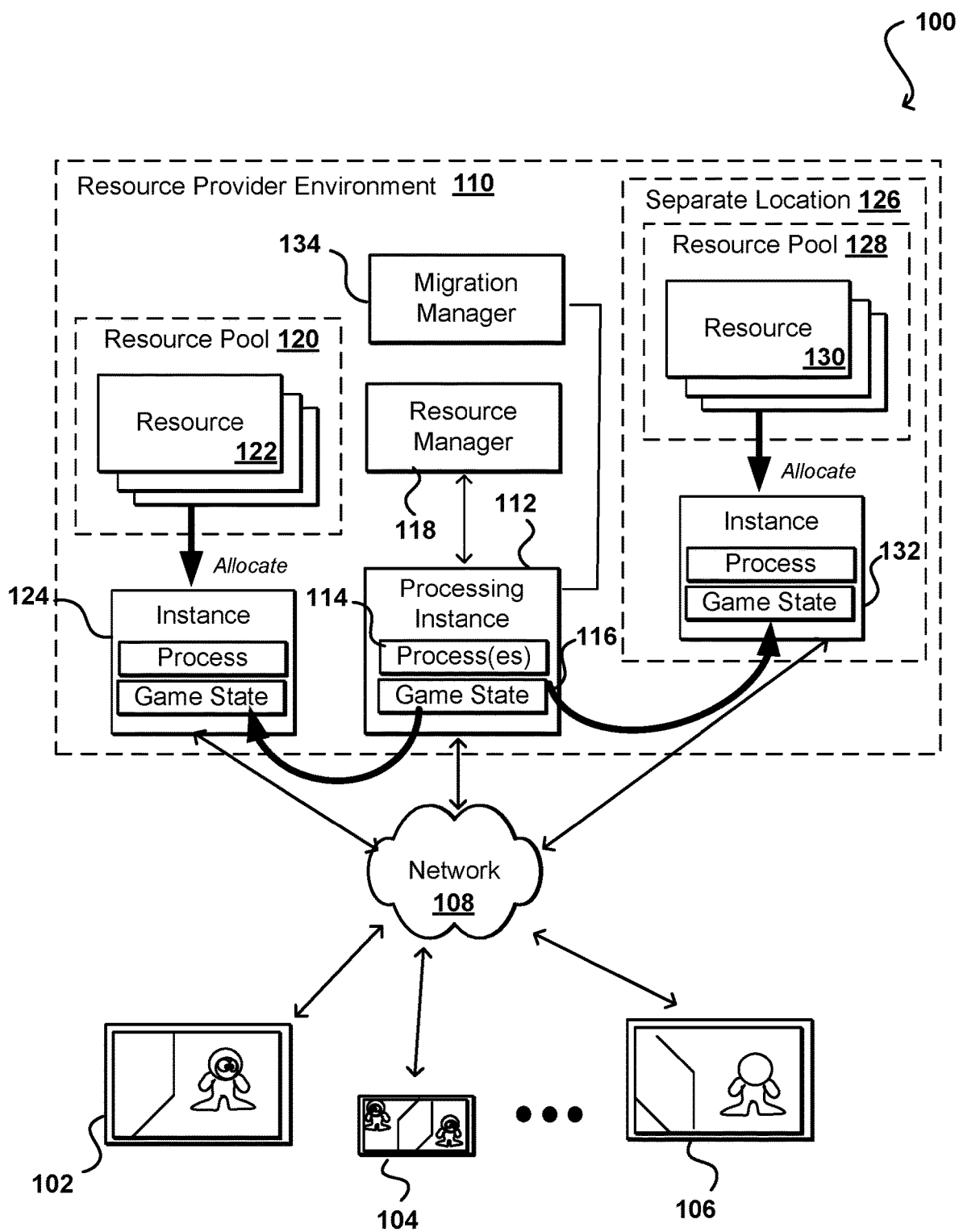
FIG. 1 illustrates devices joined in an example gameplay session for a multiplayer game that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for execution and management of hosted applications. In particular, various approaches provide for the dynamic selection and migration of types of resource capacity to be used to host specific game sessions, including individual processes (i.e., game servers) for those sessions. When requesting a game session to be hosted in a shared resource environment, for example, the session may have various criteria that enable it to be hosted on different types of resources, such as different types of resource instances (i.e., virtual machines) operating on physical servers. Once appropriate resource capacity is identified, that capacity (such as a computing instance as discussed herein) can be allocated and caused to execute one or more processes for the game session, such as to function as a game server. During the game session it might be determined that it is necessary, or would at least be advantageous, to migrate the process to different resource capacity, such as a different instance. This might be due to aspects of the hosting, such as the lack of continued availability of the current instance or a degradation in performance, or might be due to aspects of the game session, such as a change in the number or location of player devices for the session. The migration determination may be based upon other factors as well, such as a change in price or availability of capacity for hosting the process. Once a determination is made to perform a migration, new capacity such as a different computing instance can be identified, and synchronized with the current instance to reflect current game state information. This can include obtaining state data from a serialized file or transaction log, among other such options. The player devices on the session can be caused to connect or direct game state data to the new instance, and when ready the new instance can be responsible for the game process, such as by taking over as the game server for the session. Once the player devices are utilizing the new instance, the process can be terminated on the old instance and the instance destroyed or reallocated.

Various other functions can be implemented within the various embodiments as well as discussed and suggested elsewhere herein.

FIG. 1A illustrates an example gaming configuration 100 that can be managed in accordance with various embodiments. Similar configurations can be utilized to support other types of applications as well as would be apparent to one of ordinary skill in the art in light of the teachings and suggestions contained herein. In this example, there are multiple player devices 102, 104, 106 participating in a multiplayer gaming session hosted by at least one processing instance 112, or other processing resource, offered through a resource provider environment 110. The processing instance can be any appropriate type of processing resource, such as a physical or virtual server or machine instance as discussed elsewhere herein. A processing instance 112 can store and execute code for one or more processes 114 for a gaming session, or may execute all server-side code for the game or game session, etc. The player devices 102, 104, 106 will transmit player state data over at least one network 108 that is received to the processing instance 112 (or the instance responsible for maintaining game state) and the aggregated game state data 116 can be stored or cached locally on the processing instance, or at least otherwise made available. The resource provider environment may be associated with an entity other than a developer or provider of the gaming application. If separate entities, a game developer might purchase an amount of resource capacity from the resource provider that can be provided using available capacity of a set of resources 122, which may be maintained in a pool 120 of resource capacity. As known for such purposes, a given physical machine may have unused portions of its capacity allocated to such a capacity pool. Each resource 122 may be able to host multiple game sessions, and the allocation of those resources can be managed by a resource manager 118 or other such component, process, or service as discussed in more detail elsewhere herein.

In this example the game offers multiplayer capability, whereby multiple players can utilize their respective devices to connect to the processing instance 112, which may function as a game server, over at least one network 108, such as the Internet, a local area network, a dedicated gaming network, a peer-to-peer network, or a cellular network, among other such options and combinations thereof. The players can join in a session of the game with state data that is managed by a game state component of the game server. In some embodiments, players can join an existing session in process, and leave during the session, such that the number of players may vary over time. The player devices can include specific gaming devices, such as gaming consoles or handheld consoles, or other computing devices such as smart phones, tablet computers, wearable computers (e.g., smart glasses or watches), desktop or notebook computers, and the like. State information can be transmitted from the player devices at appropriate times, such as periodically, in response to certain actions or occurrences in the game, in response to requests from the server, or at other appropriate times. The processing instance 112 can maintain the game state information 116 such that the game state is consistent across the various devices, as well as to enable a saving or restoring of the game for any or all of the devices.

In many instances, a first player will submit a request to join a session of a specified gaming application supported by the processing instance 112. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. If a resource is not already allocated for this session, then a new resource or resource instance can be selected, such as by the resource manager 118 and from the resource pool 120, to host the gaming session. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

In many situations, the player devices will be at different geographical locations. In order to ensure that all the game state information utilized by the player devices is accurate, player input in many cases will be transmitted from the individual player devices to the relevant processing instance 112, such that the game state 116 can be updated and propagated to the various player devices, such that the devices are all utilizing consistent game state information. The game state information can include, for example, position and orientation information for the players and objects in the game, as well as gameplay data for actions being performed in the game environment by any of the players or other gameplay elements. Such an approach can result in difficulty managing state for the game, however, as any instance of player data must be transmitted from the respective player device to the server, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball or shooting a paint gun, a first player might direct the action towards a last known location received for a target player. The action will be likely to miss, as the other player may have moved since the last received location such that the first player may see the action take place but the action will actually fail because when the game state data is synchronized the target player will actually not have been in that location. The game server then might have to retract the apparently completed action, or wait to determine whether the action is successful, either of which can significantly degrade the gaming experience.

It might be the case that the available resource capacity is located in different geographical or physical locations. The distance between the resource and the gaming devices can further impact the latency for the game session, which can have negative implications as discussed. Thus, it can be desirable in at least some situations to attempt to provide the capacity using resources that are relatively close to the players to the game, in order to minimize latency due to physical distance. It may not always be practical, however, to select the closest available resource capacity, however, as there may be other considerations relating to the selected resource. For example, different types of resource capacity can have different costs, and it may be cheaper for a developer to buy a fixed amount of capacity even though that capacity might not always be the closest to the potential players.

In order to help alleviate this problem, some resource providers enable customers, such as game developers, to purchase resource capacity, such as specific compute instance, on an as-needed basis, or on-demand. The ability to purchase capacity with this amount of flexibility comes with a certain price, however, as the resource provider has to maintain sufficient available capacity to support this offering. Accordingly, a resource provider environment 110 can provide different capacity offerings that are able to support the performance of various tasks, such as hosting game sessions, at a lower price and/or with greater flexibility.

A particular aspect to certain types of games, versus other electronic applications, is that many types of games have fixed or maximum durations or times of execution. For example, a sporting game might have a fixed time limit, and other games might have a maximum amount of time allocated to complete a task, such as a time limit for completing a race. Given some amount of time for startup and completion, for many types of games a determination can be made as to the maximum length of time for which a resource will be needed. For such an approach, a customer might be able to purchase a limited-time resource, such as a compute instance that will be exclusively allocated to that customer for up to the maximum amount of time. In some embodiments the customer may only be charged for the amount of time actually used, but will have that resource reserved for up to the allocated amount of time.

For other games, the length of time may not be reasonably certain or determinable. For these types of games, a limited time resource may not be appropriate. It might be the case, however, that due to the nature of the game or the revenue model for the game that the developer may want to use lower cost resources where available. For some of these developers it may make sense to purchase excess resource capacity where available. Such an approach is sometimes referred to as a "spot" market, whereby customer can bid for capacity that is reserved for other customers but not currently being used. Since this capacity is already paid for by another customer or entity, the excess capacity can come at a significantly lower price than if reserving that amount of capacity. The customer having reserved the capacity may also get some discount or price break for allowing the excess capacity to be made available on the spot market. A customer can attempt to obtain the lower cost capacity, and use it as long as it is available and the gaming session is active. It is always possible, however, that the reserved customer can reclaim that capacity for use. The reclaiming of that capacity can cause the gaming session hosted on that capacity to end, although in other embodiments the session may be able to be moved to other, potentially higher cost resources. In many embodiments a notice will be provided at a point in time before the termination of the resource allocation, such as two minutes before the capacity will be reclaimed for use by the reserved customer. The game developer can then take various actions to account for the early termination, such as to notify the players and potentially modify one or more aspects of the game, as discussed in detail elsewhere herein. The spot instances may be the least expensive option, but are not guaranteed for any length of time other than the notice period in some embodiments. In at least some embodiments, however, there may be at least a minimum amount of time for a spot instance, such as at least five minutes in some embodiments.

When attempting to obtain capacity to host a game session, a customer of a resource provider in at least some embodiments can provide information such as whether the customer is willing for the session to be interrupted, and in some cases a maximum likelihood of interruption. The customer may specify a blanket risk, or can specify for individual sessions, as may be based upon factors such as the type or level of players, type of game, predicted game length or outcome, and the like. A customer may also be able to specify whether to favor cost savings or game performance, among other such options. If excess capacity can be identified that meets the criteria for the session, then the excess capacity can be selected to maximize cost savings. If, however, the risk of interruption is too great but the game is of a determinable maximum length, then a time-limited resource may be selected. If the risk of the excess capacity is too great and the game is of indeterminable length, then a conventional resource selection process can be used, such as may utilize reserved capacity for that customer.

Further, there may be additional considerations for resource selection as mentioned herein. For example, the customer might provide a maximum acceptable latency threshold that must be satisfied. It might be the case, then, that available excess capacity could be used to host the game session, but that the latency cannot be guaranteed to be within the allowable limit based upon factors such as physical distance between the capacity and the players. Thus, different but more expensive capacity may need to be selected. In some embodiments there may be excess capacity available that is cheaper but comes with greater latency. There may also be limited-time capacity that is slightly more expensive, but offers better latency performance. A selection algorithm or weighted combination of factors can then be used in some embodiments to select the appropriate capacity for hosting a session. As mentioned, a customer might select to optimize for performance or cost, which can impact the selection process. The customer might also provide some criteria, such as a function that indicates the acceptable tradeoff between cost and latency. Such a function may also take into account the risk of interruption. A resource allocation manager or other such component may then generate a score for each resource option, which can then provide a ranking or other indication for the various options. In such an embodiment, the highest ranking option may be selected, where the score is based on a combination of factors that may include projected or historical latency, projected risk of interruption, and cost, for resource capacity that is able to be provided of the type and for the length of time requested. In some embodiments the cost savings might not be in a per-minute savings but in a per session savings. For example, if a prior approach sold capacity by the hour then an approach that enables a customer to buy capacity by the minute might charge more per minute, but a three minute allocation may cost significantly less than a one hour allocation. On the other hand, capacity that is not guaranteed and can be interrupted may be significantly less on a per-minute (or other measure) basis. And in some embodiments the session requests can include bid prices for each type of capacity, where the request specifies a ranking and price for each available capacity option and then the highest ranked option where the bid is a winning bid is selected for that customer session. Approaches to bidding for resource capacity are known in the art and, as such, will not be discussed herein in detail. Such an approach would expand upon the options available for bidding through such a system.

In some embodiments a customer may also be able to specify a set of instance types that can be used to support a specific type of game session. The customer can provide the relevant configuration for each, as well as the maximum latency or interruption risk values, etc. This information can be used to determine the available capacity for a session, and the individual characteristics and criteria can then be used to rank the options within that available capacity. As mentioned, the customer can also provide information as to whether to optimize for performance or cost as discussed herein. This information can be analyzed for each received request, such as for each gaming session to be hosted in a resource provider or "cloud" environment.

Once any relevant selection criteria are determined, a resource manager 118 can allocate one or more resources to host the gaming application, or one or more processes for the gaming session. The gaming devices 102, 104, 106 can then connect to the allocated processing instance 112 for purposes of participating in the gaming session. During the gaming session, however, there might be advantages to having one or more processes for the session, or the entire gaming session, hosted on one or more different processing instances. For example, a process might be hosted using capacity that is being reclaimed, such that it will no longer be available to host the game. In other instances, there might be a degradation in performance due to an issue with the resource instance, or the locations of the player devices might have changed such that there are better hosting options that would reduce latency for the game. The number of players might have also changed such that a resource with greater capacity is needed, or may have decreased such that a smaller capacity resource could be used that would come at significantly reduced cost for the session. Further still, in some embodiments it may be determined that capacity has become available at significantly lower cost such that it may be advantageous to migrate the session even if the current processing instance is performing adequately. There may also be security or maintenance issues that warrant or necessitate a migration. There may be various other migration criteria satisfied as well as discussed and suggested herein, and as would be apparent to one of ordinary skill in the art in light of the discussion and suggestions.

In many situations, however, it would be undesirable to terminate the current gaming session. In these situations a "live" migration would be desirable where the game session can continue with minimal to no interruption, or potentially any indication to the players that a migration is occurring. Such an approach can involve new resource capacity being allocated, and the current state information obtained by the new resource capacity such that the new capacity can pick up where the existing capacity will leave off at, or near, the point of transfer of hosting responsibility.

In the example situation 100 of FIG. 1, the resource manager 118 can utilize the hosting criteria discussed above, along with information about the reason(s) for the migration, to select new resource capacity for hosting the process(es) or gaming session. For example, if the reason for the migration is that the currently allocated capacity was obtained through the spot market and will be reclaimed, then the resource manager can select capacity of the same type from the resource pool 120, which may also be from the spot market. If the reason for migration is that a type of resource capacity has become available at significant cost savings, then the resource manager can select a new instance 124 of that type to which to migrate at least one or more processes for the gaming session. It might be the case, as mentioned, that there is an issue with latency for current players based on their location, or there may be a problem with a specific location or set of resources, among other such options, which might make it advantageous to migrate the game session to a new instance 132 selected from resources 130 of a resource pool 128 at a separate location 126 (even from a different provider such as the game provider), such as a data center in a separate country or geographic region. In such an example, the resource manager 118 (or a resource manager in the separate location 126) can allocate capacity from the separate location, can cause the state information to be transferred to the new instance 132, and can direct the player devices to connect to the new instance in that location, which in some situations may be closer, at least on average, to the players resulting in potentially reduced game latency.

In order to enable the newly allocated resource capacity to handle the live migration, the newly allocated capacity 124 will need to obtain game state data or otherwise be synchronized with the processing instance 112 that is currently hosting the process or session being migrated. The synchronization can occur in a number of different ways. For example, the entire game state can be serialized to a state file that can be transferred or stored in a location accessible to multiple resources. When a newly allocated instance initiates the process to be executed for the session, the instance can obtain the serialized file and indicate to the current server, or a game server, that the newly allocated instance is available to host the process for the session. In some embodiments a snapshot of the file or game state can be provided to the new instance, which can then receive any subsequent data for updating the game state. In some embodiments the game management server will transfer the game file to the new instance and instruct the new instance to load that state, at which time the player devices can be instructed to connect to the new instance. Once the last player device reconnects the new instance can restart the game, although in some embodiments there can be a period of synchronization where both the new and old instances receive state data so the game can continue relatively seamlessly, although with a potential period of slightly enhanced latency, until all player devices are connected to the new instance.

In another embodiment, object serialization of the network can be used for the migration. When a new instance is allocated, the instance can be provided with connection information for the current game session. The new instance can connect to the existing instance and begin a catch up process to obtaining the current state data, similar to how a player device joining the session might obtain the current state data in synchronizing the state of the world. Once the new instance is synchronized it can notify the current instance (or a game manager, etc.,) that it is ready to take over, and the migration can occur. In some embodiments the new instance can take over authority immediately, while in others the player devices can be requested to move or reconnect to the new instance. Once all player devices have connected to the new instance, the old instance can be terminated, reallocated, or otherwise released from responsibility for the current game session.

In another approach, all actions taken in a game session can be written to a transaction log. When a new instance is allocated, the instance can read the transaction log and update to the current state by processing the transactions in sequence. Once the new instance is up to date, the instance can elect itself as the master and the player devices can connect to the new instance. The information can continue to be written to, and pulled from, the transaction log by both instances until all player devices are connected to the new instance.

In yet another embodiment, IP address or other address remapping can occur such that the player devices do not have to perform a reconnection action. If the new instance is synchronized as discussed herein, the IP address of the old instance can be remapped to the new instance, such that existing packets in flight will be rerouted to the new instance automatically. In such an approach, the players may not be able to determine that a migration has occurred.

In other embodiments, a full instance migration can occur as well as discussed elsewhere herein.

As mentioned, there can be many reasons why it might be desirable or advantageous to migrate at least a process for a game session. As used herein, the process can refer to a game server running on an instance that contains the state data and simulation of a game session. As mentioned, in some embodiments the capacity might be obtained using a spot market or other such approach wherein the capacity is only available for a limited amount of time, or is subject to being reclaimed or reallocated for specific purposes. If the resource is to be unavailable before the current game session has completed, it can be desirable to migrate the live session to another resource that can allow the session to continue or complete. In such a scenario, a game session with ten connected players can be in progress using a game server process running on a spot instance. The spot instance might be selected for termination and a two minute warning may be provided. A game manager receiving the warning can select and prepare a new instance for the game migration, and can start a new game server process on that instance to receive the in-progress game session. A game manager might also create the appropriate metadata for the new game server process, such as may include game session and player session information. The game manager can instruct the existing game server that it needs to replicate its state to the new game server, and can pass along the appropriate connection information. The old game server replicates its state to the new server. In this example the old game server might pause the game while it instructs the game clients on the player devices to connect to the new game server, which has the game state data up to the point in which the game was paused, although pausing is not required in all embodiments as discussed herein. In many embodiments the pause may be so brief that there may be no noticeable impact on gameplay. The game clients can connect to the new server which then resumes the game session. Once the game clients are all connected to the new server the old game server can shut down and the corresponding instance terminated or otherwise repurposed.

As mentioned, various other types of applications can benefit from such live migration as well within the scope of the various embodiments. An advantage for certain gaming applications is that a game manager as discussed herein can be aware of occurrences in the game session, such as the connecting and disconnecting of various player devices, that enable various migration decisions to be made based upon the state of the game. As mentioned, this can include migrating to smaller or larger instances as the number of active players changes, or switching to resource capacity in a different geographic location based upon the locations of the game clients currently connected to the session. Information such as a remaining duration of a game session can also be used to select spot capacity that will be available for a remaining duration of the session, or avoid capacity that will not. Further, such application management provides for communication to the various player devices, which facilitates the live migration. The ability to migrate individual processes also is advantageous because there may be multiple processes running on a single instance, and it might be desirable to only migrate one or more of those processes for various reasons discussed herein.

As mentioned, in many embodiments a game manager will manage the migration. In some embodiments there may also be a migration manager 134, which may be game-specific or might manage migration for multiple games and applications. The migration manager 134 might monitor a set of migration triggers (latency, performance, etc.) or analyze various types of information (available instance types, current costs, etc.) to determine if one or more migration criteria are satisfied. There might be some migration criteria that apply to all applications, such as where an instance will be reclaimed or maintenance is required, and some that are application-specific, such as may relate to minimum latency or maximum cost criteria for hosting a session for a specific game. The migration manager can work with the resource manager to ensure appropriate capacity is allocated, and can ensure that the newly allocated capacity is synchronized and able to take over responsibility on the current session. The migration manager might also manage instructions to the various player devices, as well as managing termination of the old process once the migration of players to the newly allocated capacity has completed. In the event of a migration error, the migration manager can also be responsible for any rollback operations or migration to yet another new instance, etc. If such an approach is used with an application without significant external visibility, the process can be configured to check in periodically to determine whether a migration should occur.

Figure 2:
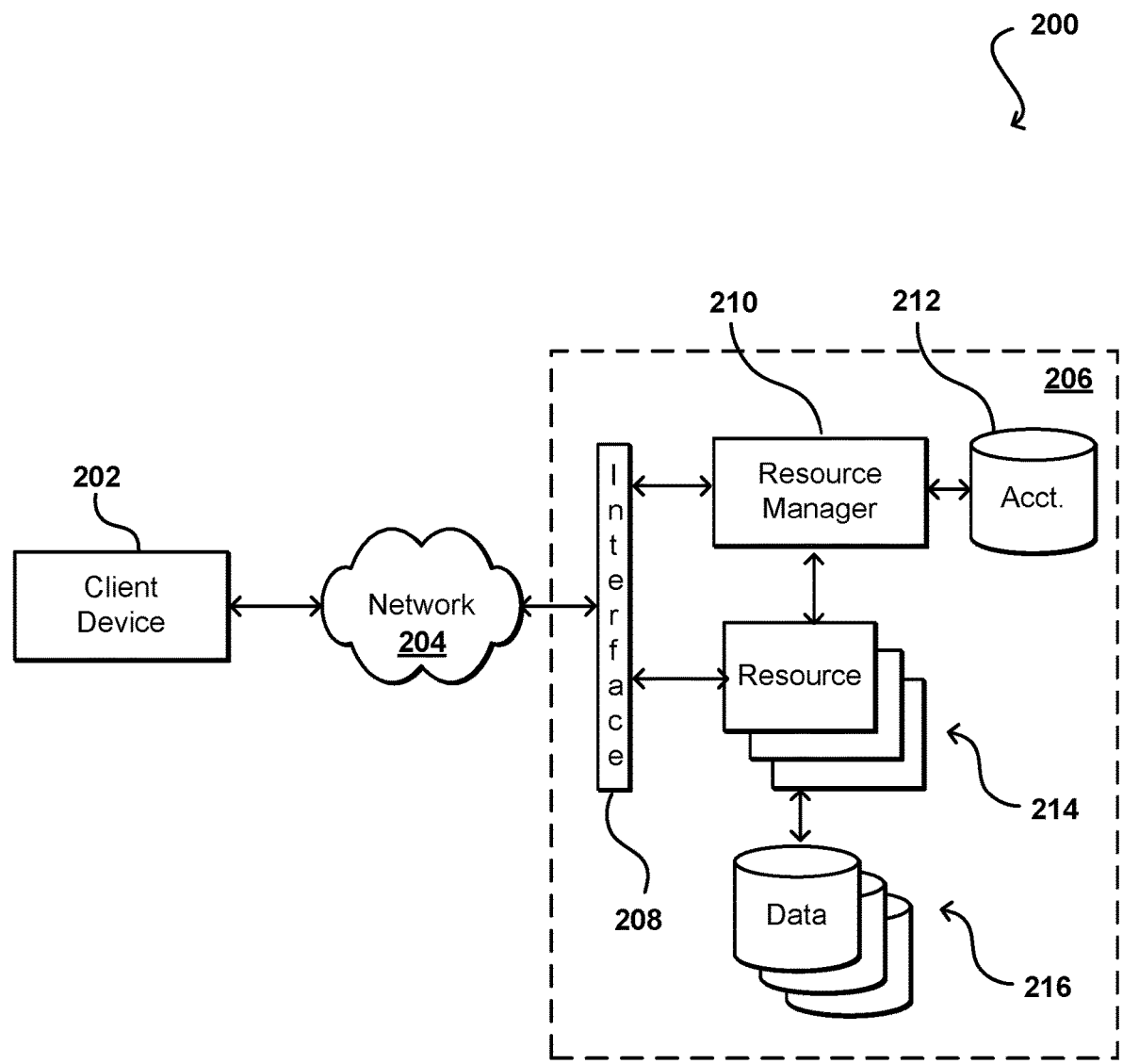
FIG. 2 illustrates an example resource environment in which various embodiments can be implemented.

FIG. 2 illustrates an example environment 200 in which aspects of the various embodiments can be implemented. In this example a user is able to utilize a client device 202 to submit requests across at least one network 204 to a multi-tenant resource provider environment 206. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 204 can include any appropriate network, including an intranet, the Internet, a cellular network, a local area network (LAN), or any other such network or combination, and communication over the network can be enabled via wired and/or wireless connections. The resource provider environment 206 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 214 of one or more types. These types can include, for example, application servers operable to process instructions provided by a user or database servers operable to process data stored in one or more data stores 216 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 214 can submit a request that is received to an interface layer 208 of the provider environment 206. The interface layer can include application programming interfaces (APIs) or other exposed interfaces enabling a user to submit requests to the provider environment. The interface layer 208 in this example can also include other components as well, such as at least one Web server, routing components, load balancers, and the like. When a request to provision a resource is received to the interface layer 208, information for the request can be directed to a resource manager 210 or other such system, service, or component configured to manage user accounts and information, resource provisioning and usage, and other such aspects. A resource manager 210 receiving the request can perform tasks such as to authenticate an identity of the user submitting the request, as well as to determine whether that user has an existing account with the resource provider, where the account data may be stored in at least one data store 212 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 202 to communicate with an allocated resource without having to communicate with the resource manager 210, at least until such time as a relevant aspect of the user account changes, the user is no longer granted access to the resource, or another such aspect changes.

The resource manager 210 (or another such system or service) in this example can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 3:
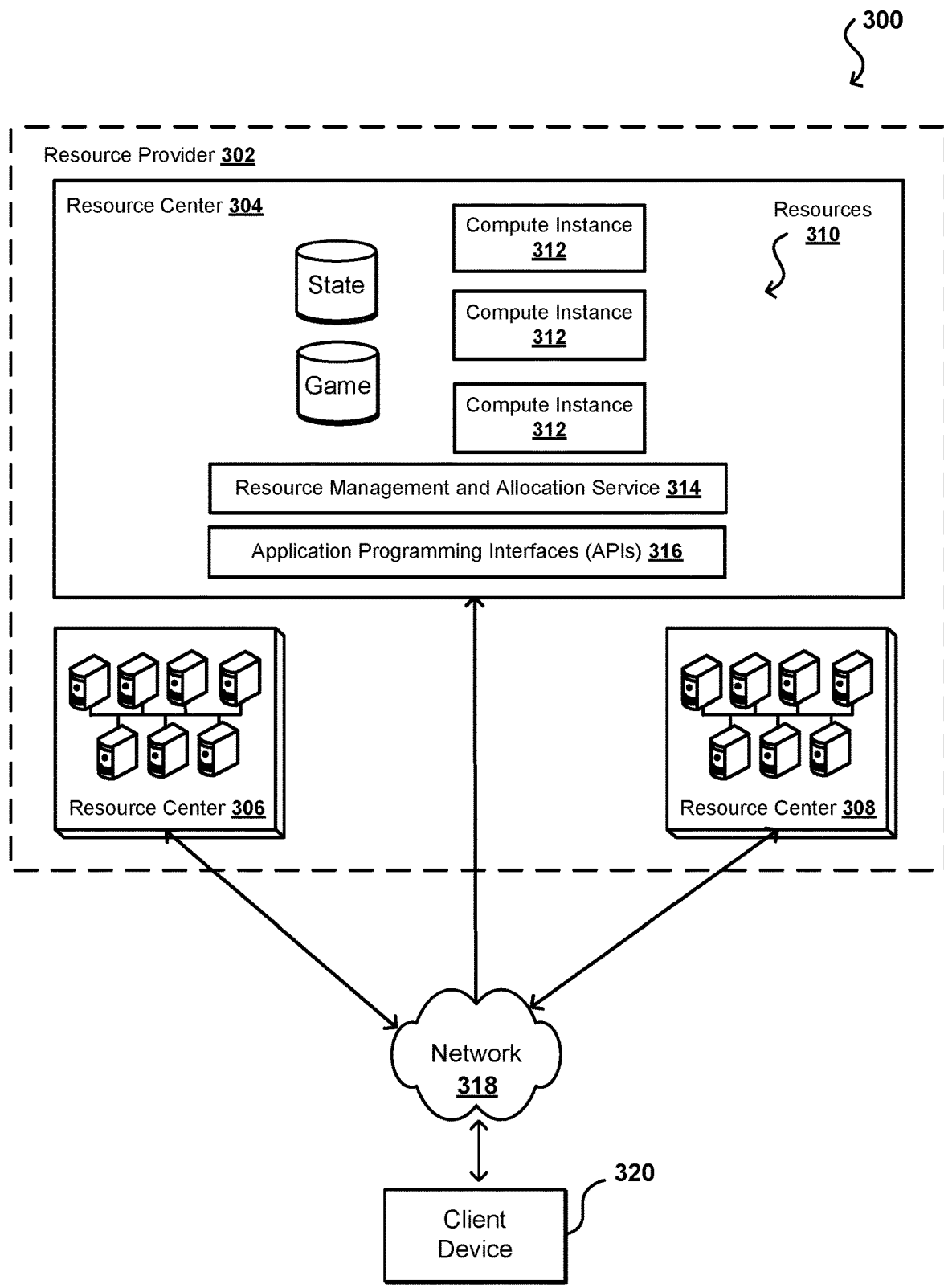
FIG. 3 illustrates another example resource environment in which various embodiments can be implemented.

FIG. 3 illustrates another example resource provider service 300 that can be utilized in accordance with various embodiments. As illustrated, a resource provider environment 302 can include a variety of devices and components (e.g., servers and network infrastructure) for receiving and processing requests from various customers and end users across one or more networks 318. As discussed, access to these resources can be provided as one or more services, such as Web services. In this example, the resource provider environment includes a plurality of resources 310, such as data storage resources and request processing resources, that can be deployed in one or more resource centers 304, 306, 308 that may be in different logical or physical locations, such as in different geographical regions, made accessible over the one or more networks 318. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, gaming host, content delivery network (CDN) point-of-presence (POP), and the like.

In accordance with various embodiments, resource centers of the resource provider 302 may include various computer servers, data storage machines, network devices and other hardware resources necessary to provide the network-accessible services on behalf of the clients of the service provider. For example, as illustrated the resource centers can include physical servers and other devices located in a particular geographical location, which enable the service provider to host game sessions and perform other functions on behalf of various client devices 320. In accordance with an embodiment, a resource center can include media cache servers, gaming servers, data servers, and the like. The view of one of the resource centers 34 is shown in an exploded view to provide further illustration of the types of resources 310 that can be contained in a resource center in accordance with various embodiments. It should be noted that the resources 310 can reside in one resource center or can alternatively be distributed across multiple resource centers.

In accordance with various embodiments, the resource provider 302 offers a resource management and allocation service 314 in addition to many other services discussed herein. In one embodiment, the resource management and allocation service 314 can perform the selection and management of resources used to host sessions for one or more gaming applications associated with a customer of the resource provider. In addition to the computing resources, the hosting of the games may require the allocation of data resources to host game state or game content, among other such options. In accordance with an embodiment, components of the resource provider environment 302 enable a game publisher to provide (e.g. upload) a gaming application to a game content store, where that application can be launched using various compute instances 312 that can each correspond to all, or a subset, of a resource such as a physical server. In accordance with various embodiments, the resource management and allocation service 314 can allocate the compute instances 312 for hosting the various gaming sessions. Information for the sessions can be provided using one or more APIs 316, for example, which can be used to provide the criteria or configuration information to be used for selecting and hosting a game session. In one embodiment, each compute instance is a virtual server resource or virtual node having a specific processing capacity and memory associated therewith, which allows the service provider to meter the usage of the resources for each customer. That is to say that each gaming session can be associated with a customer, and the usage of those resources allocated to the customer can be aggregated for at least cost purposes. In an alternative embodiment, the compute instances can be actual server machines in the resource center 304 maintained by the service provider and leased to its customers as discussed herein.

It should be noted that the locations of the various resources are not limited to any particular resource center, server or physical computing device. It will be evident to one of ordinary skill in the art that various stores, storage containers, servers, compute instances, gaming services, and other resources described herein can be located in any resource center or distributed across multiple resource centers or geographical locations, allowing data or content to be replicated across all or some of the devices therein. For example, one resource center 306 could be in Europe, one resource center 308 could be Asia, and one resource center 310 could be in the United States. In various embodiments, the various storage containers, servers, compute instances, transcoding services and other resources described herein could also reside on a single device.

In accordance with various embodiments, the resource management and allocation service 314 can provide game publishers with an automated game session workflow system that is reliable and scalable. The game publishers may define the session parameters on their own or leverage a set of predefined common device profiles that are provided by the service provider. The service can allow the game publishers to upload game content to the storage instance, define a workflow, host the relevant game session, and deliver the results to the appropriate players or other destinations. In some embodiments, the game session results can be made available or delivered to third parties for distribution, such as through an online video sharing service. Generally, a game publisher (e.g. customer of the resource provider) can register for an account by signing up, for example, with the resource provider to gain access to resource management and allocation service 314. Once an account is created, game content can be placed into a game store on the resource provider. A workflow can be defined using an application programming interface (API) 316 or console, for example, to manage game sessions which will be carried out using one or more of the compute instances 312. In accordance with various embodiments, the resource provider 302 may implement a number of pricing models for using the resources as discussed herein. As one option, the pricing could be based at least in part on the usage of compute instances 312 are utilized by the game publisher, including the type and duration of such utilization. For example, on-demand instances can let customers of the provider pay for compute capacity by the hour or for maximum-duration periods of time, as discussed elsewhere herein. As an alternative option, the game publishers can use reserved compute instances. When using reserved instances, game publishers can make a one-time, up-front payment for each instance they wish to reserve for a long period of time (e.g. 1-3 year term). In return, the customer may be given a discount off the ongoing hourly usage rate for the instances.

As an alternative option, a set of spot instances could be utilized. In accordance with an embodiment, spot instances enable a game publisher to bid on, and purchase, unused capacity of the compute instances of other customers at a market place. In some embodiments, instances sold on the spot market may be reclaimed at any moment (with some notice period) if they are needed for customers that have previously reserved the computing capacity. In some cases, the spot instances may be used for game sessions where the potential for interruption is not extremely important. In other cases, using spot instances may be an effective way to get sessions hosted cheaply if there are a significant number of spot instances available. Taking advantage of low bid opportunities for instances can provide a customer (e.g. a game publisher) with pricing advantages they may not have been offered without building out services on their own.

In accordance with various embodiments, each computing resource instance can be reserved for use by a particular customer or other user for a defined period of time. During the time periods where that customer is not using the resource, at least some excess or otherwise unused resource capacity of that computing resource may be made available to other users on a temporary or non-guaranteed basis, such that the excess resource capacity can be allocated to other users until a time that the capacity is desired for other purposes (e.g., for preferential or reserved use). Such excess capacity may, for example, be made available as part of one or more general excess capacity pools that are available for use by various users, such as via a spot market with dynamically changing pricing to reflect supply and demand. In some cases, one or more programs may be executing on behalf of a user using excess resource capacity at the time that the excess resource capacity is desired for other purposes, and, in some such cases, the use of that excess capacity (e.g., storage for that user in the excess capacity) may be automatically terminated (e.g., deleted) by the computing resource in order to make that excess capacity available for the other purposes. In at least some embodiments, the user requests or operations can be automatically restarted at a future time, such as when a sufficient amount of excess capacity again becomes available for such purposes. Alternatively, other resource capacity may be identified and used in place of the excess resource capacity that is desired for the other purposes, so as to enable the operations relying on the excess resource capacity to continue to be processed or otherwise fulfilled.

Customers can utilize the unused or excess capacity from dedicated, reserved, or other such resource capacity. In accordance with an embodiment, customers can bid to use the excess capacity. For example, a customer can submit a game hosting request for an instance with a bid price and a specification of at least one resource guarantee to be provided for the request, such as a minimum throughput, compute capacity, etc. If a resource becomes available that meets the capacity requirement(s) for the instance request, if the bid exceeds any other requests (or otherwise has preference or priority), and if the bid at least meets a current market price for that capacity, the instance request can be processed using the excess capacity. In various embodiments, the customer with the winning bid will obtain dedicated use of that excess capacity for at least a period of time to process the transcoding operations associated with the instance created per the instance request. After that minimum time, the bid amount can be reexamined and, if the request no longer meets the winning criteria discussed above, or some other such criteria, fulfilling of the instance request for that user on that resource can be terminated (e.g., the instance can be terminated on that resource). Further, if the capacity is excess capacity reserved or dedicated to another user, the customer can be kicked off the resource at any time if the dedicated or reserved customer resumes using that resource.

Figure 4:
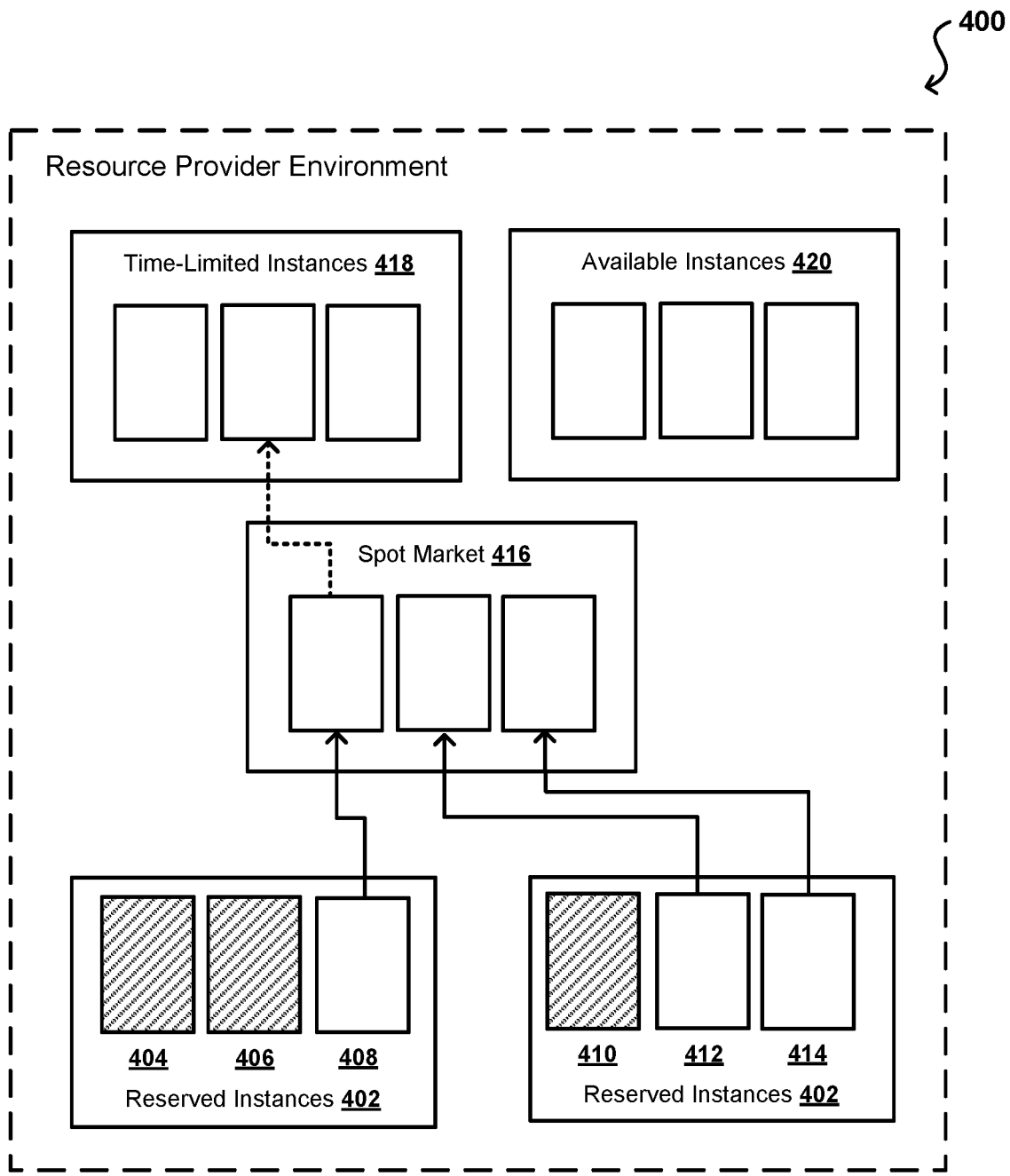
FIG. 4 illustrates an example resource environment including multiple types of instance options that can be utilized in which various embodiments can be implemented.

FIG. 4 illustrates an example resource provider environment that includes various types of capacity that can be allocated for hosting game sessions and other such tasks in accordance with various embodiments. In the illustrated embodiment, the resource provider 400 provides a market whereby a customer can purchase capacity for different types of instances. This can include a spot market 416 that enables various game publishers, or other content publishers or customers, to bid for unused resource capacity of the resource provider 400. The spot market can take the form of a graphical user interface (GUI), console, application programming interface (API), a web application or any other component. In this example, the customer can also purchase time-limited instances 418, which function as guaranteed or reserved instances are only available for up to a maximum length of time. In some embodiments the time-reserved instances can also come from the spot market if the notice period or other criterion for the capacity enables those resources to be provided for the specified period of time without interruption, such as where the notice period is five minutes but the time limited resource is needed for two minutes. The customer can also purchase available instances 420 using a conventional approach, such as to reserve instances for an extended period of time as discussed herein.

In accordance with one embodiment, the resource provider 400 allows customers to reserve resource instances for a specified period of time for a specific price. The resource instance can be any resource that provides some unit of computing capacity, such as a virtual machine, server instance, or the like. For example, as shown in the illustrated embodiment, a first customer has reserved resource instances 404, 406, 408 and a second customer has reserved resource instances 410, 412, 414 for at least a specified time interval. During the time interval that the instances are reserved, the instances can be utilized by the reserving user at any time.

In many instances, however, a reserving user may not always be using all of the resource instances reserved on their behalf. There may often be time periods in the reservation interval, during which some of the reserved instances are remaining idle and not performing any computation. In accordance with an embodiment, the spot market 416 enables the service provider to utilize those idle instances 408, 412, 414 to host gaming sessions or perform various types of jobs for other users, while still guaranteeing that the reserved instances will be ready to immediately begin processing jobs of the reserving user if the need for them should arise. In accordance with an embodiment, the spot market 416 may accept bids for resource capacity from various users, such as one or more game publishers. Once a bid is received, the spot market can evaluate the bid and determine whether it meets or exceeds the current spot market price. In accordance with an embodiment, the current spot market price fluctuates periodically according to supply and demand for resource instances in the spot market. If, at the time of receiving the user's bid, the bid at least meets the current spot market price, the service provider can begin hosting the game session using the spot market instances. The session can continue being executed for as long as the content publisher's bid at least meets the current spot price. In accordance with an embodiment, if the spot market price rises above the bid, the session may be interrupted or suspended. Notice can be given, as with a customer reclaiming the instance, before termination. In accordance with various embodiments, if the reserving users invoke any of the reserved instances that are currently in the spot market 416, those reserved instances may be immediately taken out of the spot market pool and provided to the respective customer that reserved the instance. For example, if a reserving user invokes a resource instance 408, any game session being hosted by that resource instance 408 may be provided with notice before the capacity is reclaimed and allocated to the reserving user. The game session that was previously being hosted by the resource instance 408 may be to another available spot market instance if the bid still at least meets the current spot market price at that time.

Figure 5:
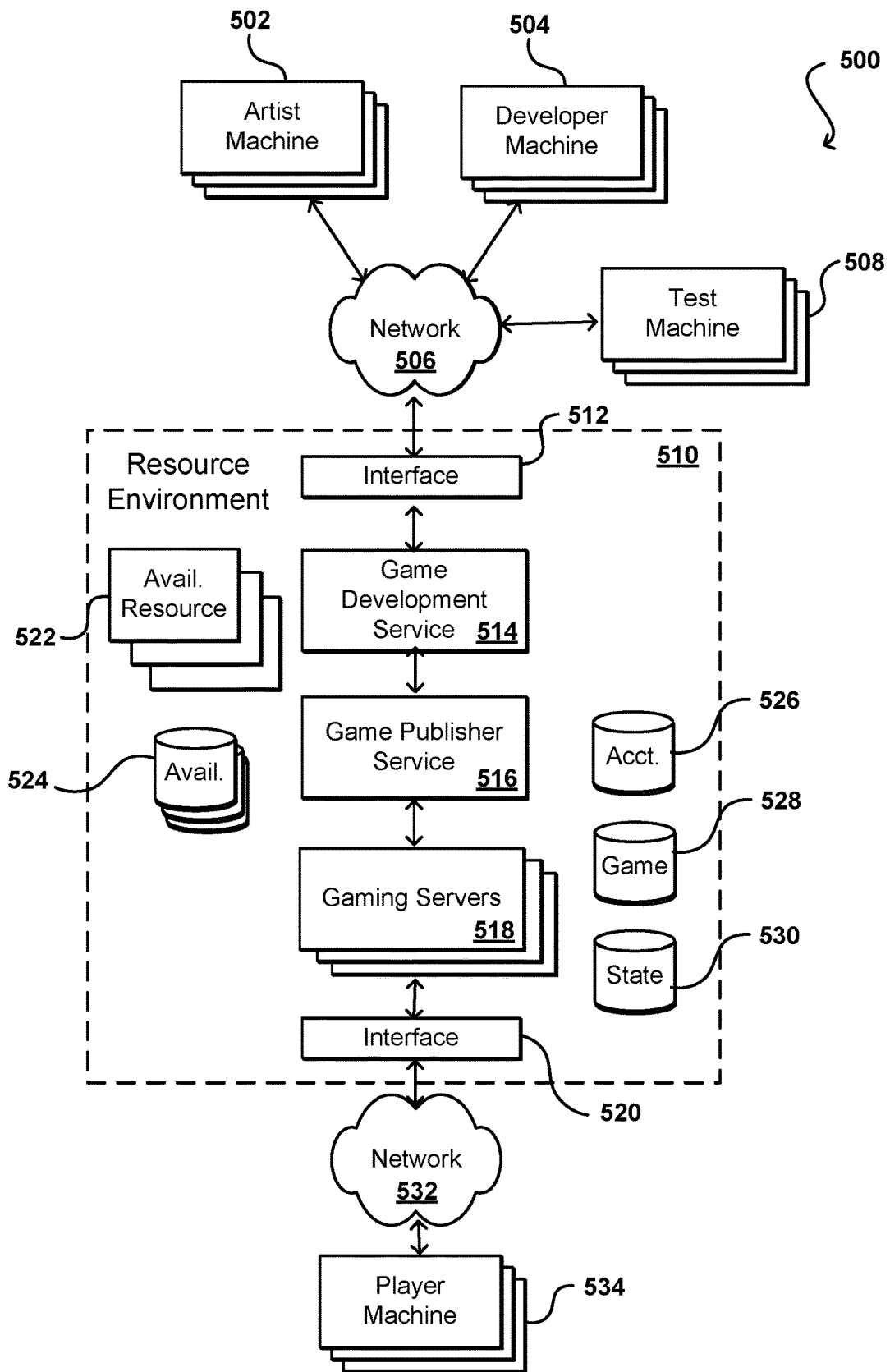
FIG. 5 illustrates an example gaming pipeline that can be used in accordance with various embodiments.

As illustrated in the example system 500 of FIG. 5, at least some of the resources can be used to support platforms and services useful in the development and providing of electronic gaming and three-dimensional graphical content, among other such options. For example, the artist machines 502 and developer machines 504 can collaborate via a game development service 514, which can be provided by a set of resources in the resource environment 510 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 528, where the repositories can include graphics files, code, audio files, and the like. The game development service 514 can also work with an account manager, or at least maintain information in an account data store 526, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like. The game development service 514 can also be used to specify criteria, such as maximum acceptable latency, that can be used to select resource capacity to host sessions for the gaming application.

Once the game development reaches an appropriate stage in the development cycle or pipeline, as may relate to alpha or beta testing, actual release or updating, etc., the appropriate content can be made accessible to a game publisher service 516. The game publisher service 516 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 504 or otherwise. In some embodiments the game content might be published and made available to one or more test machines 508, which may be associated with the customer, such that the customer can test various builds or versions of the game. In some embodiments feedback provided by the test machines 508 may be provided to the game development service 514, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 518 which can run the game and enable player machines 534 to access the game content over one or more networks 532, which may be different from the network(s) 506 used for game development. This can include, for example, dedicated gaming networks, the Internet, cellular networks, and the like. The player machines 534 can communicate with the appropriate interfaces of an interface layer 520 to obtain the gaming content. In some embodiments the player machines 532 will download the gaming content for execution on the individual machines, and will upload (or otherwise communicate) gaming data, messages, and other information to the gaming servers 518, as well as to other players, social networking sites, or other such recipients. The gaming servers 518 can cause state information for the various instances of the game to be stored to at least one game state repository. This can hold state for the game as a whole or for individual game sessions, among other such options. In some embodiments the game content can be executed by the game servers and streamed in near real time to the player machines 534. In some embodiments there may alternatively be a mix of gaming content executed on the player machines and the gaming servers. Peer to peer connections among the player machines and other communications can be utilized as well in various embodiments.

Such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function, whether specifically related to hosting a game session or otherwise. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the ability to utilize different types of capacity can come with a significant cost savings in at least some embodiments. For example, excess capacity or spot instances can be obtained at significant cost reduction, such as with discounts between 40% and 80% with respect to an on-demand fleet in some embodiments, depending upon the current bid rate for the capacity, among other such factors. Similarly, discounts can also be obtained for the limited time capacity, but these discounts may be less than for the excess capacity and may be at a fixed rate, such as at a 45% discount. In some embodiments the rate may depend in part upon the length of time for which the resource is requested. The additional resource options provide benefit to the customer in relation to cost and potentially performance and other aspects, while such options can provide the resource provider with flexibility in the types of instances used and the ability to place a hosted game server into a region that may be closer to the player than might otherwise be possible, potentially improving latency and other such characteristics. The flexibility can also help the resource provider to rebalance capacity as appropriate. As mentioned, potential tradeoffs for the customer are the potential for excess capacity instances to be interrupted, or for games to time out if hosted on limited time instances. Further, since excess capacity for a particular type of resource may be insufficient at the time of a request, a customer can specify multiple acceptable instance types with appropriate configurations that can be used to host the game session. A customer might then provide selection criteria or preferences, such as to select the available type with the lowest cost, highest performance, or lowest risk of interruption, among other such options. A customer in some embodiments might also provide priority selections with respect to the geographic locations of the resources. The flexibility of instance type can also reduce the amount of time needed to initiate a game session, particularly where some instance types can be queued up for such hosting when capacity is available. In some embodiments a resource console can be used to manage the various instance options.

In some embodiments, a ranking may not be used to select the appropriate resource capacity. Instead there may be a start point for the search, which may continue until an appropriate type of resource capacity is located. For example, a resource management service or game hosting service might determine the locations of players to a game session, and determine a location for potential resource capacity that is closest to those players or would offer reduced latency or otherwise improved performance. In such an approach, an instance can be selected as soon as one is found that satisfies the various hosting criteria, in order to start the game more quickly. The search can continue and extend to different locations until appropriate capacity is located.

Figure 6:
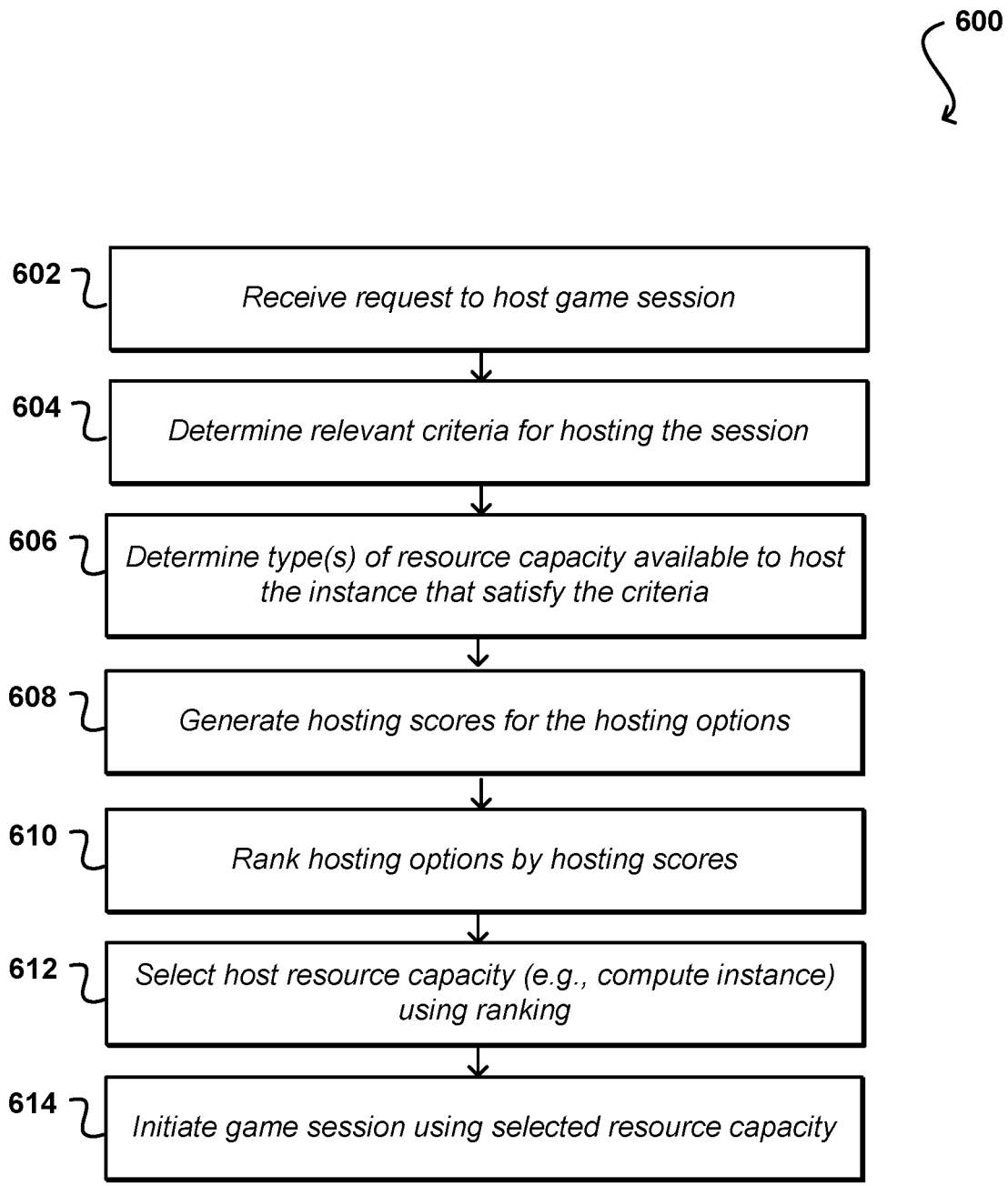
FIG. 6 illustrates an example process for selecting resource capacity for a gaming session that can be utilized in accordance with various embodiments.

FIG. 6 illustrates an example process 600 for identifying resource capacity to host a game session that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the users are selected from a pool of potential users for a specific session or purpose, etc. In this example, a request is received 602 to host a game session using resource capacity from a resource provider environment. The request can be received from a game publisher system or from an individual client device to participate in the game session, among other such options. In at least some embodiments, one or more aspects of the request are verified before processing. These aspects can include, for example, a valid request format, a type of game capable of being hosted by the resources, authorization to host the game, a valid requestor identity or gaming customer identity, and the like.

If the request is a valid and authorized request in this example, the relevant criteria for hosting the game session can be determined 604. As mentioned, this might include a set of types of resources that the customer has approved for hosting sessions, a length of time needed for the game session, as well as various performance or configuration criteria as discussed elsewhere herein, among other such options. A resource management service or other such system can determine 606 the type(s) of resource capacity that are available to host the instance that satisfy the above criteria. These types can include, for example, types of physical resources with specific types or amounts of capacity. Where spot market options are available, the types can also include on-demand capacity purchased for an extended period of time, limited time capacity, or excess but interruptible capacity, among others. The various hosting options can be analyzed to determine 608 hosting scores for the various options. In some embodiments a scoring algorithm or function can be used to calculate scores for the various hosting options using various metrics for the available options. The scoring function can be provided by a customer, can use customer-specified weightings, or can use weightings learned over time using machine learning, among other such options. The hosting scores can then be used to rank 610 the various hosting options, such as from a highest to a lowest hosting score. A hosting option, or available host resource capacity, can then be selected 612 using the ranking, such as to select a highest ranked hosting option. As mentioned, the hosting option can relate to a type of compute instance, such as a limited time instance or instance provided using excess capacity as discussed herein. The game content can then be loaded onto the selected host as appropriate and the game session initiated 614 on the selected game server host instance.

An approach such as that described with respect to FIG. 6 enables selection among various types of resources based upon resources that satisfy the various criteria, and that provide cost savings that justify the potential tradeoffs. It might be the case, however, that a type of game does not lend itself to certain types of capacity. For example, a game of indefinite duration may not be successfully hosted on a limited time instance. Further, certain game publishers may not want to have their games potentially interrupted at any time, as that may significantly degrade the user experience for certain types of game. Further still, some providers might not provide excess capacity and limited time resources in some implementations.

Figure 7:
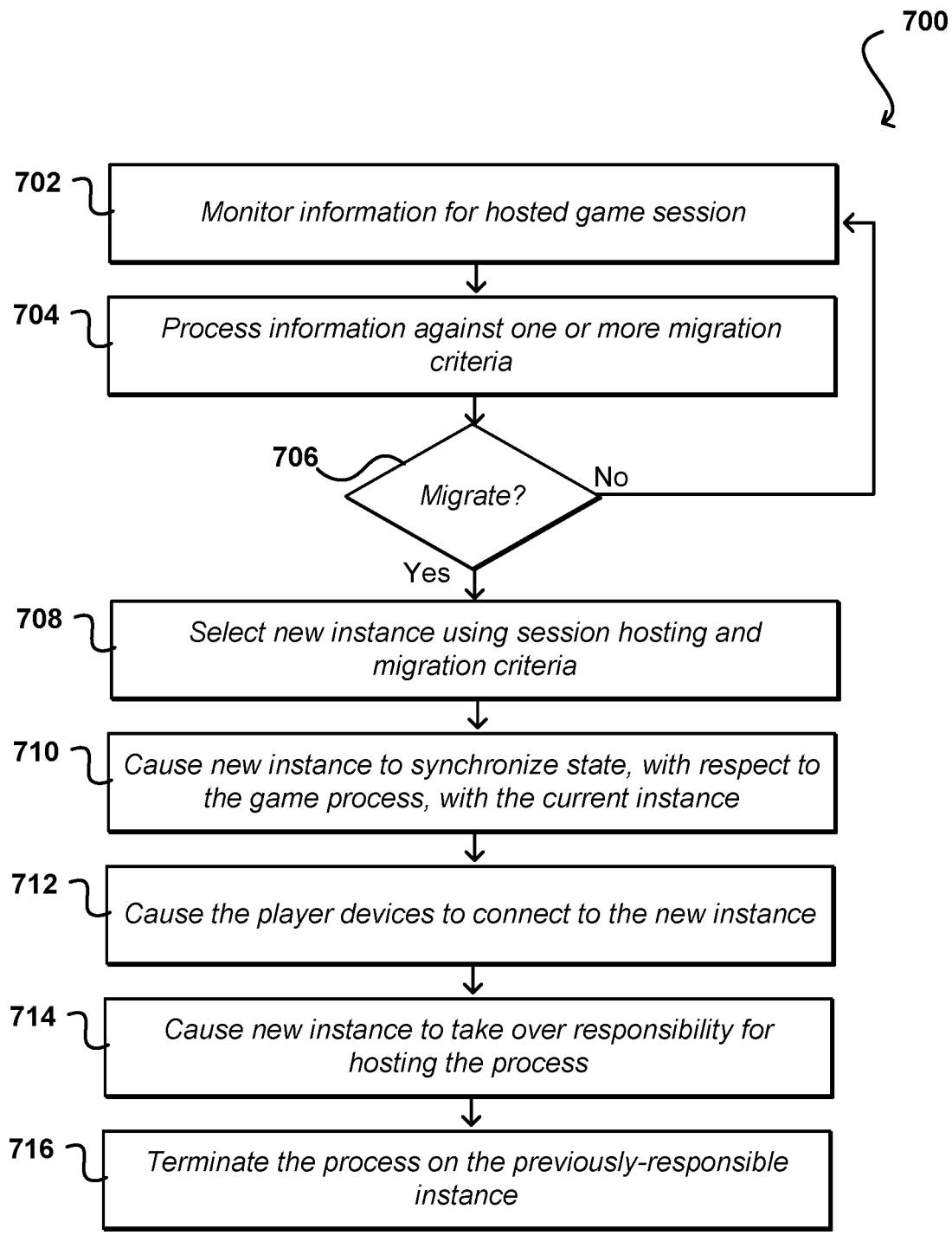
FIG. 7 illustrates an example process for performing live migration for an active gaming session that can be utilized accordance with various embodiments.

FIG. 7 illustrates an example process 700 for performing live migration of a process for a game (or other application) session that can be utilized in accordance with various embodiments. In this example, various types of information for a game session can be monitored 702, such as by a resource manager or game system, among other such options. The information can include information about the game, such as may relate to a current number or location of players, as well as a remaining time duration for the session. The information can also include information about the hosting of the session, such as may relate to an availability of current instances, changes in resource pricing and availability, network latency, and security requirements, among other such options discussed and suggested herein. The information can be processed 704 or otherwise analyzed against one or more migration criteria, which can indicate conditions where it may be required, or at least advantageous, to migrate at least a process for the game session to different resource capacity. The criteria in various embodiments can relate to the monitored information, such as for an amount of session duration versus resource availability, a cost versus utilization criteria, and others referenced herein. If it is determined 706 that none of the migration criteria are satisfied then the session can continue until a criterion is satisfied or the session completes or is terminated.

If, however, it is determined that at least one migration criterion is satisfied then a new instance, or other source or measure of resource capacity, can be selected 708 to host the migrated process. The selection process can utilize the host selection criteria for the game session, such as discussed with respect to FIG. 6, but can also take into account the migration criteria or reason for the migration, such as to move to cheaper capacity or to move to a specific or different geographic region, etc. The new capacity can be allocated from a pool of available capacity in at least some embodiments, and capacity such as a compute instance may be able to concurrently host multiple processes for the same application or multiple applications in various embodiments. Once selected, the "new" instance (or newly allocated instance) can be caused 710 to synchronize with the currently allocated instance for the process. As mentioned, this can be performed in various ways, such as by transferring a state file, using a transaction log, or remapping an IP address, among other such options. The player devices can be caused 712, or at least requested, to connect to the new instance, except for situations such as a remapping where new connections may not be required. The new instance, once current on state and potentially upon connection of one or more player devices, can be caused 714 to take over responsibility for hosting the process. The process can then be terminated 716 on the previously-responsible instance, such as after the various player devices are all connected to the newly allocated instance now responsible for hosting the process.

Figure 8:
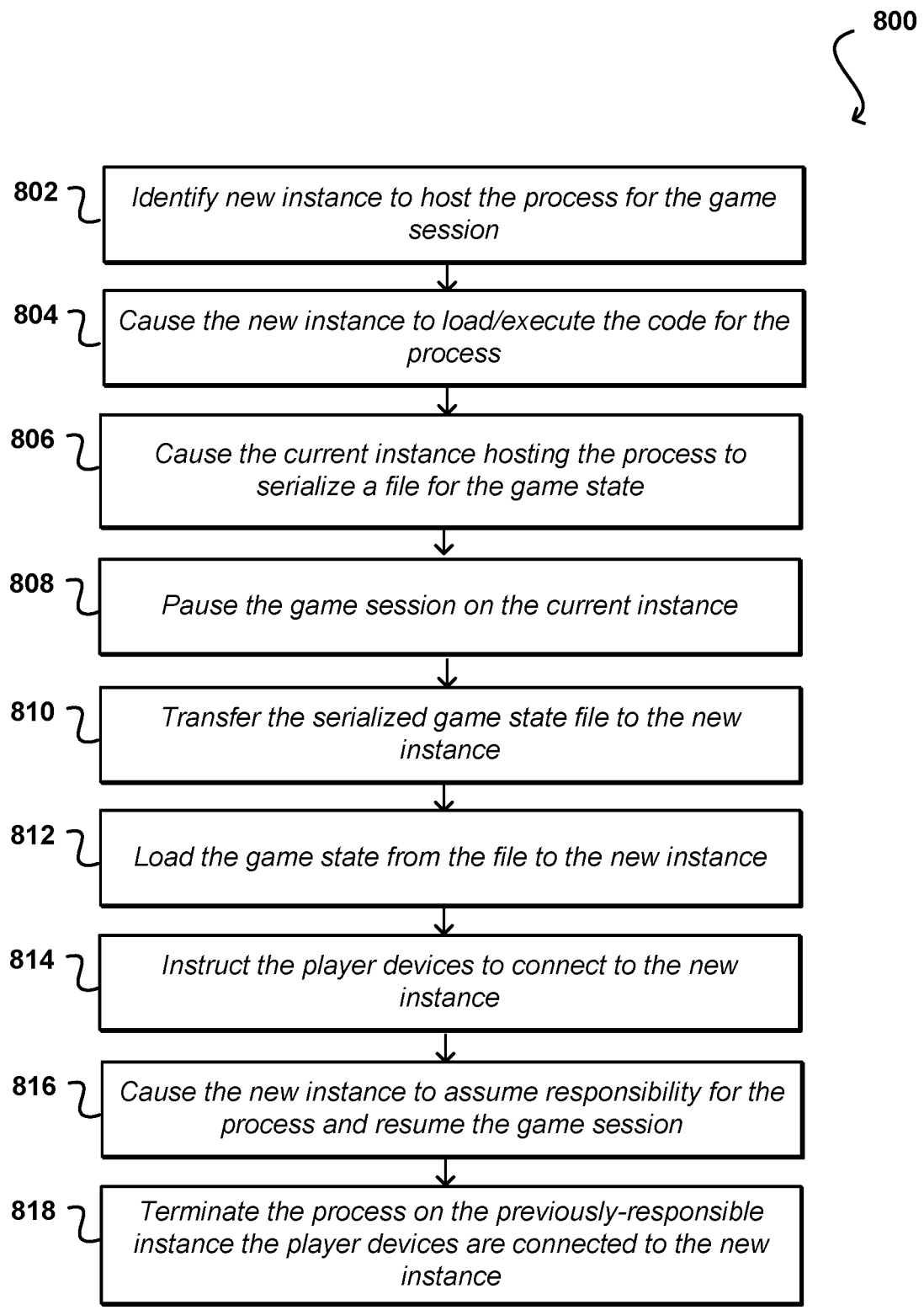
FIG. 8 illustrates an example process for performing a live migration that can be utilized accordance with various embodiments.

FIG. 8 illustrates an example process 800 for performing live migration of a process for a game session that can be utilized in accordance with various embodiments. In this example, a new instance has been identified 802 to host a process for a game session, such as to act as a game server for a multiplayer game. The instance, or other measure or source of capacity, can be identified using a process such as that illustrate in FIG. 7. The new instance, if not already storing the code for the process, can be caused to load 804 the code and execute or launch the code for the process, such as to start up a game server process on the instance. In order for the new instance to be synchronized with the current instance in this example, the current instance can be caused 806 to serialize a file for the game state. Other synchronization approaches can be used as well as discussed and suggested elsewhere herein. In this example the game session can be paused 808 on the current instance, although pausing is not necessary in all embodiments. In this example the pause should be sufficiently short that no significant impact on gameplay occurs. The serialized game state file is transferred 810, or otherwise made available to, the new instance, which can load 812 the game state from the file. The player devices on the session can be instructed 814 to connect to the new instance, although in cases of a remapping such reconnection may not be required. The new instance can be caused 816 to assume responsibility for the process and resume the game session when appropriate, such as when the game state is current and one or more player devices have connected. The process can then be terminated 818 on the previously-responsible instance, such as after the player devices have connected to the new instance and it has been determined that the migration was otherwise successful.

Figure 9:
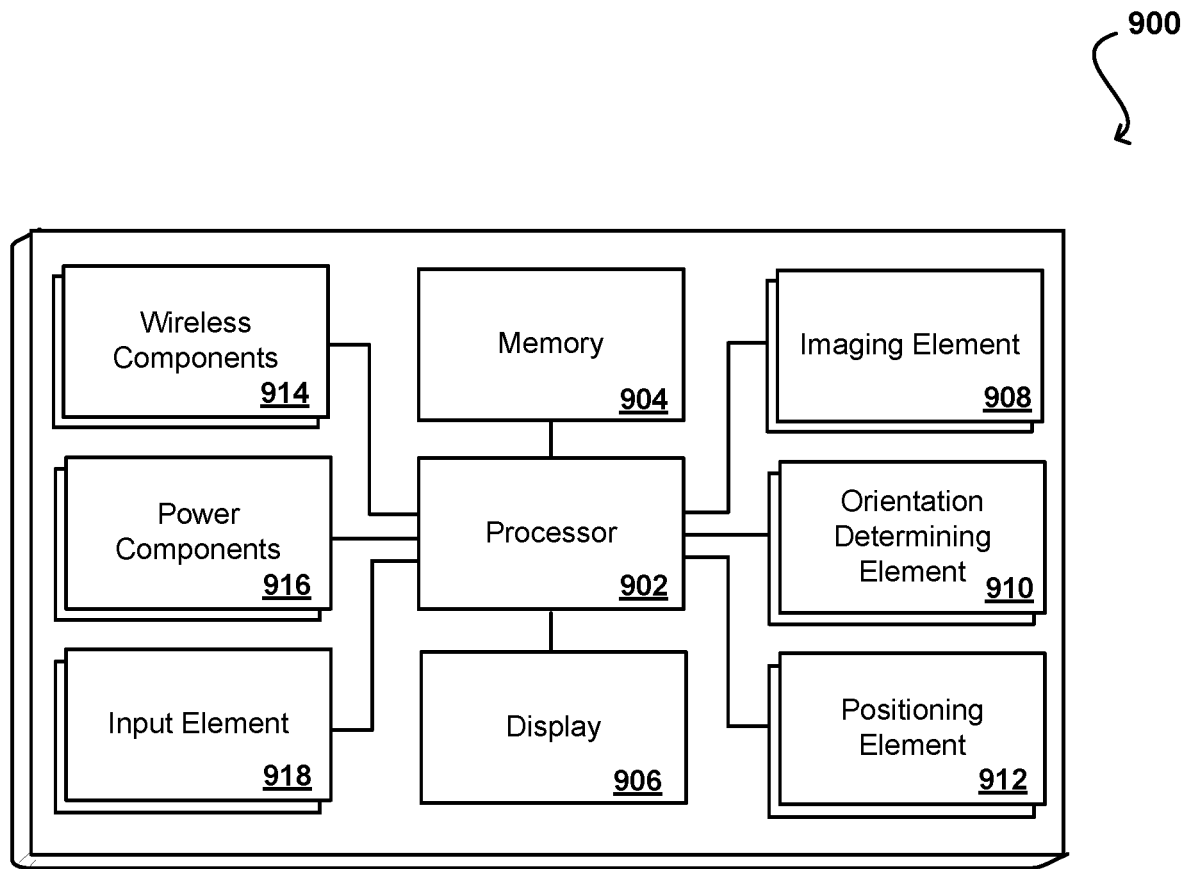
FIG. 9 illustrates example components of a computing device that can be used to implement aspects of the various embodiments.

FIG. 9 illustrates a set of basic components of an electronic computing device 900 that can be utilized to implement aspects of the various embodiments. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display screen 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   hosting a process for a game session on a first computing resource;
   determining that a migration condition is satisfied with respect to the process;
   identifying a second computing resource having capacity to host the process based at least in part on the migration condition and at least one criterion indicating a tradeoff between latency and a risk of interruption of the second computing resource for the migration condition;

causing the second computing resource to obtain state data for the process current with state data on the first computing resource;
notifying player devices, participating in the game session, of a migration to the second computing resource;
enabling the player devices to connect to the second computing resource, during the game session, to access the process executing on the second computing resource; and
terminating the process on the first computing resource.

2. The computer-implemented method of claim 1, further comprising:
causing the second computing resource to obtain the state data by at least one of loading a serialized state file, generating the state using a transaction log, or joining the game session and obtaining the state data through the game session.

3. The computer-implemented method of claim 1, wherein the process provides a game server for the game session, and further comprising:
causing the first computing resource to pause the game session before enabling the player devices to connect to the second computing resource; and
resuming the game session on the second computing resource after the second resource is synchronized with the first computing resource.

4. The computer-implemented method of claim 1, further comprising:
determining that the migration condition is satisfied by at least one of a pending unavailability of the first computing resource, a performance of the first computing resource, a lower cost of the second computing resource, or a change in capacity requirements for the game session.

5. The computer-implemented method of claim 1, further comprising:
performing address remapping for the process, wherein the player devices are automatically connected to the second computing resource.

6. A computer-implemented method, comprising:
determining to migrate a process of an active game session hosted on a first computing resource based on a determination that at least one migration condition is satisfied;
causing a second computing resource to obtain current state information for the process based at least in part on the at least one migration condition and at least one criterion indicating a tradeoff between latency and a risk of interruption of the second computing resource for the migration condition; and
causing one or more player devices, participating in the active game session, to connect to the second computing resource to continue the active game session.

7. The computer-implemented method of claim 6, further comprising:
reallocating the first computing resource after the player devices participating in the active game session are connected to the second computing instance.

8. The computer-implemented method of claim 6, further comprising:
analyzing data associated with the active game session; and
determining to migrate the process in response to the data satisfying the at least one migration condition.

9. The computer-implemented method of claim 8, wherein the at least one migration condition includes at least one of a pending unavailability of the first computing resource, a performance of the first computing resource, a lower cost of the second computing resource, or a change in capacity requirements for the game session.

10. The computer-implemented method of claim 8, further comprising:
using at least one game hosting criterion to select the first computing resource; and
using the at least one game hosting criterion and the at least one migration criterion condition to select the second computing resource.

11. The computer-implemented method of claim 8, further comprising:
selecting the second computing resource from a pool of available resource capacity, the pool capable of including resource capacity of different types or in different locations.

12. The computer-implemented method of claim 6, further comprising:
causing the second computing resource to obtain the state data by at least one of loading a serialized state file, generating the state using a transaction log, or joining the game session and obtaining the state data through the game session.

13. The computer-implemented method of claim 6, further comprising:
performing address remapping for the process, wherein the player devices are automatically connected to the second computing resource.

14. The computer-implemented method of claim 6, wherein the process provides a game server for the active game session, and further comprising:
causing the first computing resource to pause the active game session before enabling the player devices to connect to the second computing resource; and
resuming the active game session on the second computing resource after the second resource is synchronized with the first computing resource.

15. A system, comprising:
at least one processor; and
memory including instructions that, when executed by the at least one processor, cause the system to:
determine to migrate a process of an active game session hosted on a first computing resource based on at least one migration condition;
cause a second computing resource to obtain current state information for the process based at least in part on the at least one migration condition and at least one criterion indicating a tradeoff between latency and a risk of interruption of the second computing resource for the migration condition; and
cause one or more player devices, participating in the active game session, to connect to the second computing resource to continue the active game session.

16. The system of claim 15, wherein the instructions when executed further cause the system to:
reallocate the first computing resource after the player devices participating in the active game session are connected to the second computing instance.

17. The system of claim 15, wherein the instructions when executed further cause the system to:
analyze data associated with the active game session; and
determine to migrate the process in response to the data satisfying the at least one migration condition, wherein the at least one migration condition includes at least one of a pending unavailability of the first computing resource, a performance of the first computing resource, a lower cost of the second computing resource, or a change in capacity requirements for the game session.

18. The system of claim 15, wherein the instructions when executed further cause the system to:
   cause the second computing resource to obtain the state data by at least one of loading a serialized state file, generating the state using a transaction log, or joining the game session and obtaining the state data through the game session.

19. The system of claim 15, wherein the instructions when executed further cause the system to:
   perform address remapping for the process, wherein the player devices are automatically connected to the second computing resource.

20. The system of claim 15, wherein the process provides a game server for the active game session, and wherein the instructions when executed further cause the system to:
   cause the first computing resource to pause the active game session before enabling the player devices to connect to the second computing resource; and
   resume the active game session on the second computing resource after the second resource is synchronized with the first computing resource.

* * * * *